(12) United States Patent
Ren et al.

(10) Patent No.: US 11,017,662 B2
(45) Date of Patent: May 25, 2021

(54) SYSTEMS AND METHODS FOR DETERMINING A PATH OF A MOVING DEVICE

(71) Applicant: BEIJING DIDI INFINITY TECHNOLOGY AND DEVELOPMENT CO., LTD., Beijing (CN)

(72) Inventors: Cong Ren, Hangzhou (CN); Qidong Hu, Beijing (CN); Boyu Liu, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 16/750,010

(22) Filed: Jan. 23, 2020

(65) Prior Publication Data

US 2020/0166654 A1     May 28, 2020

Related U.S. Application Data

(63) Continuation of application No. 15/563,584, filed as application No. PCT/CN2016/110784 on Dec. 19, 2016, now Pat. No. 10,739,469.

(30) Foreign Application Priority Data

Mar. 14, 2016   (CN) .......................... 201610142880.5

(51) Int. Cl.
    *G08G 1/01*      (2006.01)
    *G01C 21/32*     (2006.01)
    (Continued)

(52) U.S. Cl.
    CPC .......... *G08G 1/0104* (2013.01); *G01C 21/28* (2013.01); *G01C 21/32* (2013.01); *G01S 19/39* (2013.01)

(58) Field of Classification Search
    None
    See application file for complete search history.

(56) References Cited

U.S. PATENT DOCUMENTS

| | | | |
|---|---|---|---|
| 9,279,689 B2 | 3/2016 | Van Buer | |
| 2007/0208493 A1* | 9/2007 | Downs | G08G 1/0104 701/117 |

(Continued)

FOREIGN PATENT DOCUMENTS

| | | |
|---|---|---|
| CN | 102682590 A | 9/2012 |
| CN | 102707299 A | 10/2012 |

(Continued)

OTHER PUBLICATIONS

International Search Report in PCT/CN2016/110784 dated Mar. 16, 2017, 5 pages.

(Continued)

*Primary Examiner* — Jonathan M Dager
*Assistant Examiner* — Garrett F Evans
(74) *Attorney, Agent, or Firm* — Metis IP LLC

(57) ABSTRACT

The present disclosure relates to systems and methods for determining a path of a moving vehicle. The systems may perform the methods to obtain a plurality of location points relating to a moving device; determine at least one average velocity of the moving device between two of the plurality of location points; remove at least one interfering location point from the plurality of location points based on the at least one average velocity; determine remainders of the plurality of location points as a set of effective location points based on the at least one average velocity; determine (Continued)

a path of the moving device based on the set of effective location points; and store data for the path of the moving device in the one or more storage media.

20 Claims, 7 Drawing Sheets

(51) Int. Cl.
   *G01C 21/28* (2006.01)
   *G01S 19/39* (2010.01)

(56) References Cited

U.S. PATENT DOCUMENTS

| | | |
|---|---|---|
| 2010/0114350 A1 | 5/2010 | Kanai et al. |
| 2010/0125411 A1* | 5/2010 | Goel .................. H04W 4/02 |
| | | 701/533 |
| 2012/0116678 A1* | 5/2012 | Witmer ................ G06F 16/29 |
| | | 702/5 |
| 2013/0030693 A1 | 1/2013 | De Los Reyes et al. |
| 2014/0121857 A1 | 5/2014 | Iachini |
| 2015/0019757 A1 | 1/2015 | Wechsler |
| 2016/0091324 A1 | 3/2016 | Horihata et al. |

FOREIGN PATENT DOCUMENTS

| | | |
|---|---|---|
| CN | 102707300 A | 10/2012 |
| CN | 103093618 A | 5/2013 |
| CN | 103217697 A | 7/2013 |
| CN | 104019821 A | 9/2014 |
| CN | 104215219 A | 12/2014 |
| CN | 104215256 A | 12/2014 |
| CN | 104794295 A | 7/2015 |
| JP | H08271272 A | 10/1996 |
| JP | 2005156308 A | 6/2005 |
| JP | 2008164826 A | 7/2008 |
| JP | 2011117941 A | 6/2011 |
| WO | 2012166871 A2 | 12/2012 |

OTHER PUBLICATIONS

Written Opinion in PCT/CN2016/110784 dated Mar. 16, 2017, 4 pages.
The Extended European Search Report in European Application No. 16894227.4 dated Jul. 24, 2018, 20 pages.

* cited by examiner

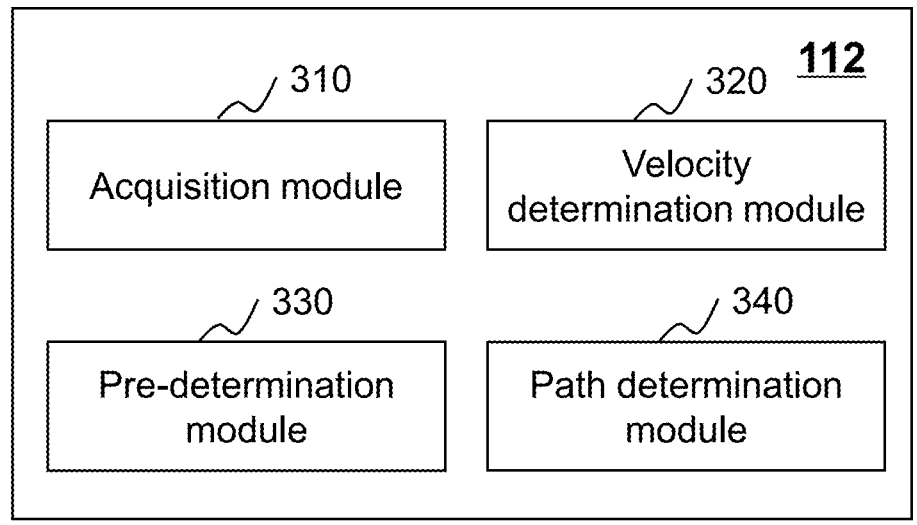
FIG. 3-A
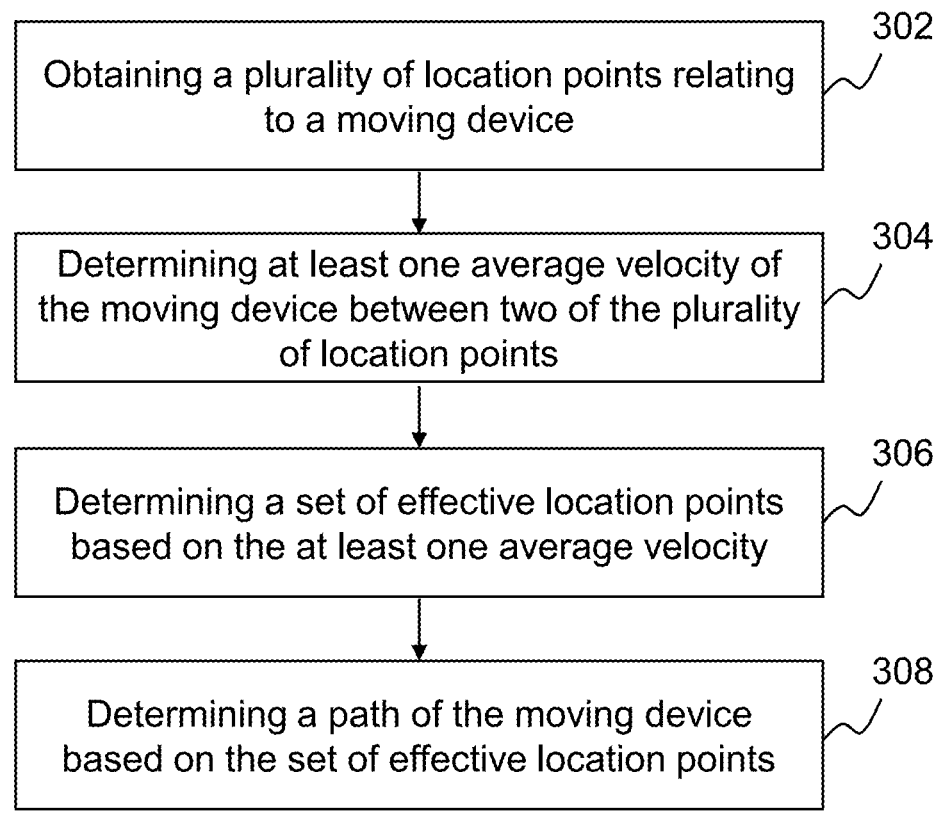
FIG. 3-B

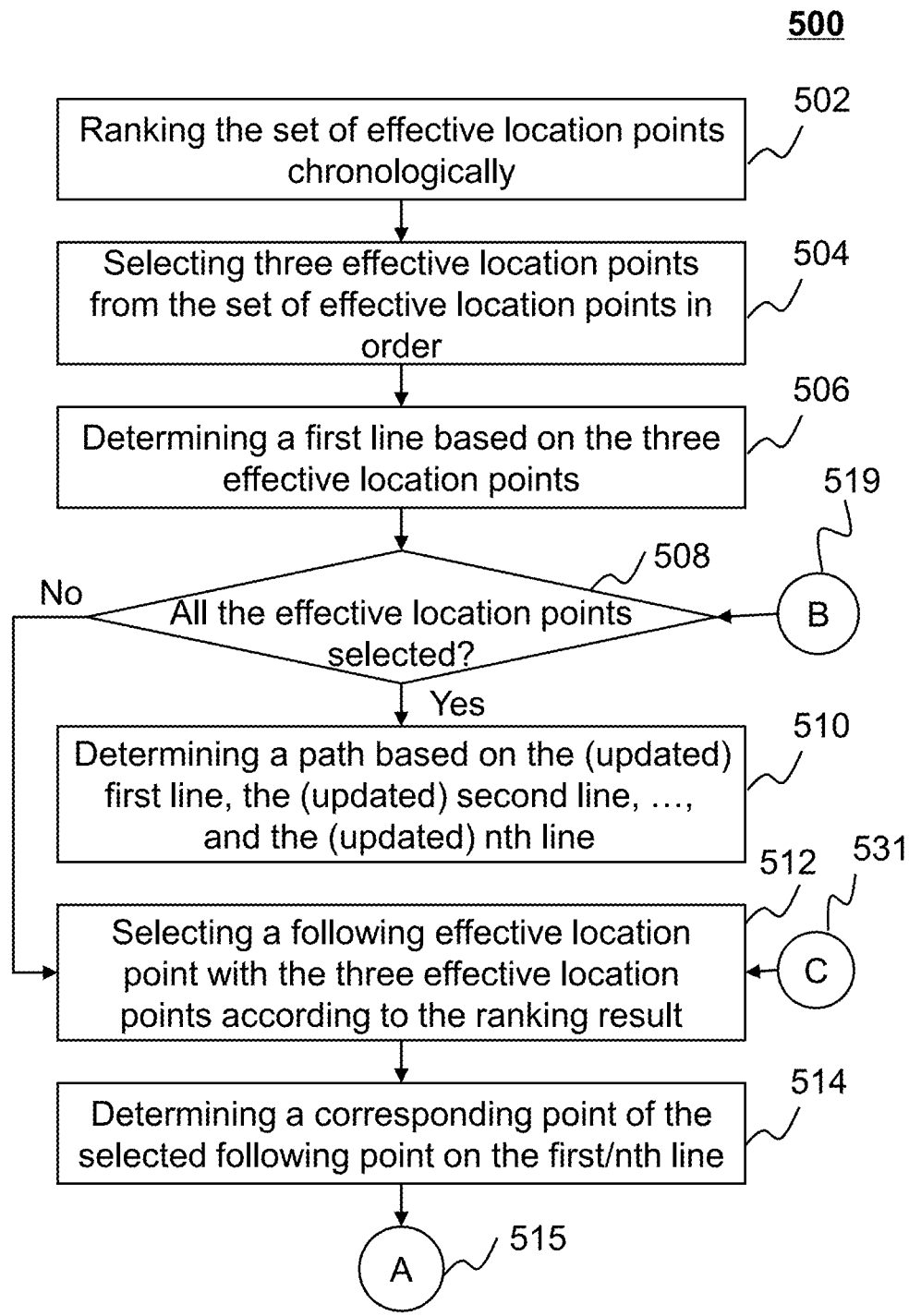
FIG. 5-A

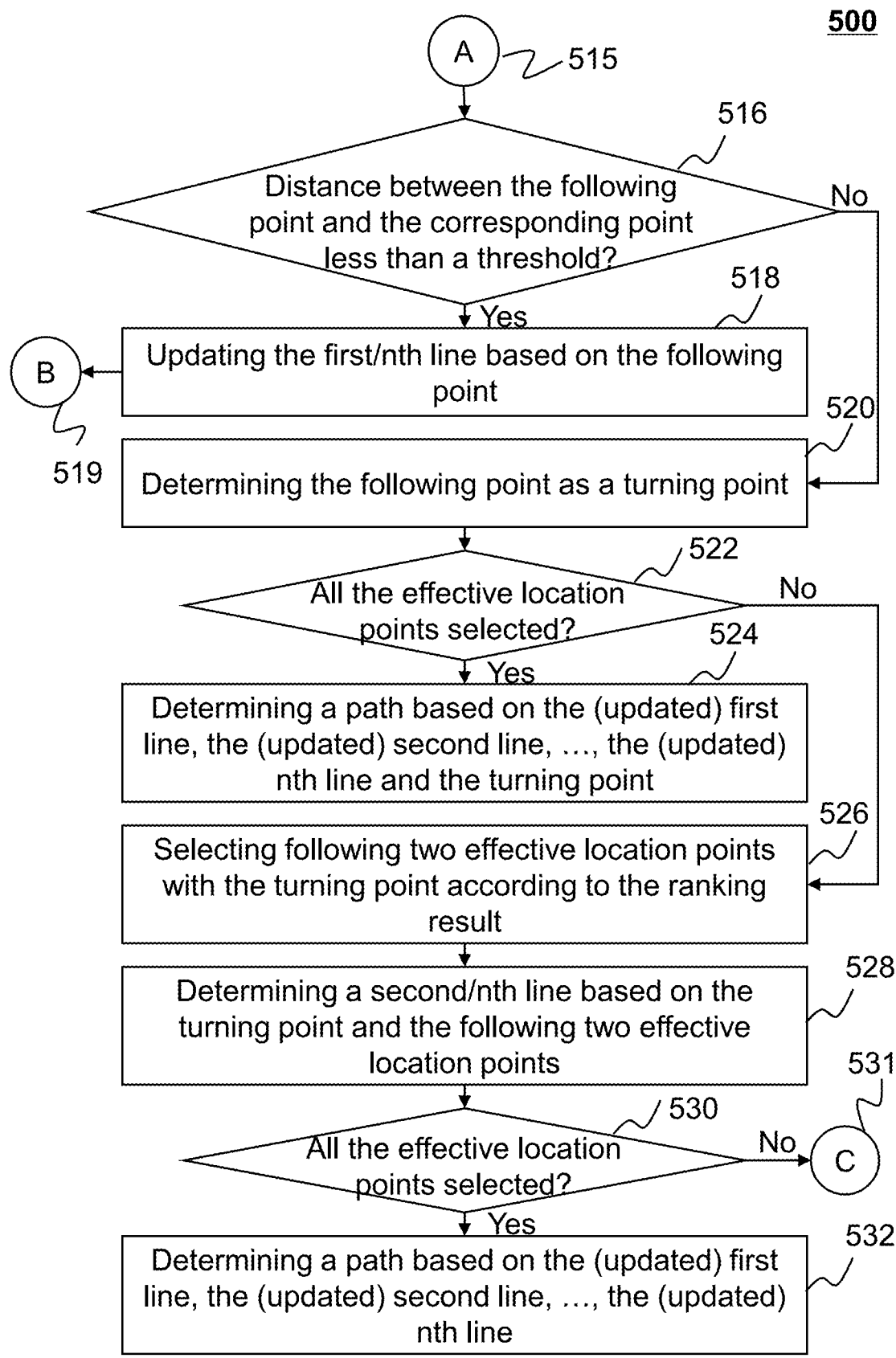
FIG. 5-B

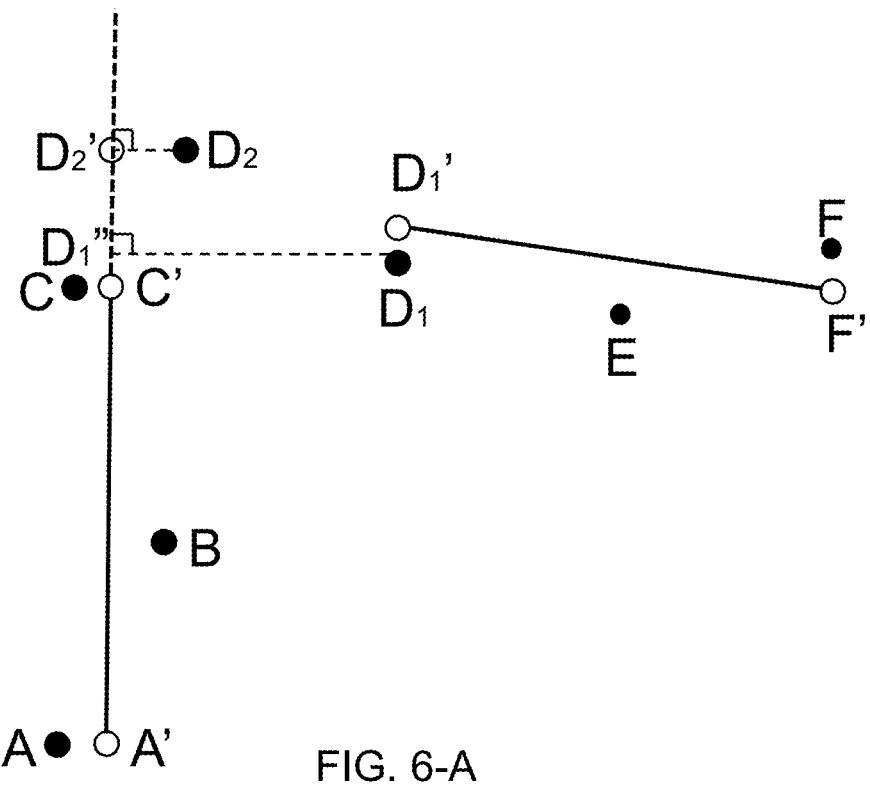
FIG. 6-A
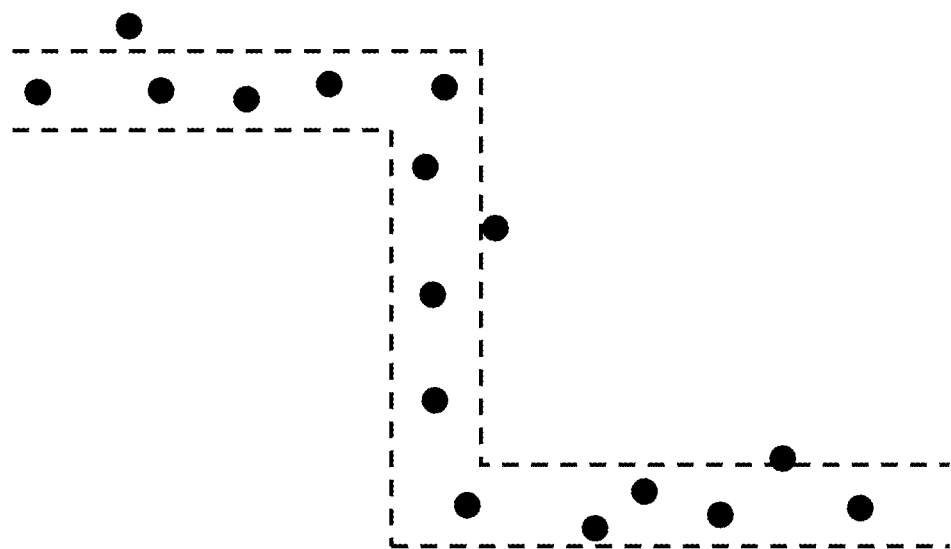
FIG. 6-B

SYSTEMS AND METHODS FOR DETERMINING A PATH OF A MOVING DEVICE

CROSS-REFERENCE TO RELATED APPLICATIONS

This application is a continuation of U.S. application Ser. No. 15/563,584, filed on Sep. 30, 2017, which is a U.S. national stage under 35 U.S.C. § 371 of International Application No. PCT/CN2016/110784, filed on Dec. 19, 2016, designating the United States of America, which claims priority to Chinese Application No. 201610142880.5 filed on Mar. 14, 2016, the contents of each of which are incorporated in its entirety by reference.

TECHNICAL FIELD

The present disclosure generally relates to systems and methods for collecting location information of a moving device, and in particular, systems and methods for determining a path of the moving vehicle.

BACKGROUND

When a moving device is moving along a road or a street, a server may collect location information (e.g., GPS information) of the moving device. The server may load map data from a database, analyze the location information of the moving device, and determine a path of the moving device based on the map data. In some situations, it may be difficult to determine the path of the moving device when the map data is unavailable.

SUMMARY

According to an aspect of the present disclosure, a system may include one or more storage media and one or more processors configured to communicate with the one or more storage media. The one or more storage media may include a set of instructions for determining a path of a moving device. When the one or more processors executing the set of instructions, for each moving device of a plurality of moving devices, the one or more processors may be directed to perform one or more of the following operations. The one or more processors may obtain a plurality of location points relating to a moving device. The one or more processors may determine at least one average velocity of the moving device between two of the plurality of location points. The one or more processors may remove at least one interfering location point from the plurality of location points based on the at least one average velocity. The one or more processors may determine remainders of the plurality of location points as a set of effective location points based on the at least one average velocity. The one or more processors may determine a path of the moving device based on the set of effective location points. The one or more processors may store data for the path of the moving device in the one or more storage media.

In some embodiments, the one or more processors may identify a region where the plurality of location points located. The one or more processors may determine that map data may be unavailable to the region.

In some embodiments, the one or more processors may construct a map based on the determined paths corresponding to the plurality of moving devices.

In some embodiments, the one or more processors may select a first point, a second point, and a third point from the plurality of location points. The one or more processors may determine three average velocities of the moving device between any two of the first point, the second point, and the third point.

In some embodiments, the one or more processors may determine a reference velocity of the moving device. The one or more processors may perform a comparison between the three average velocities with the reference velocity. The one or more processors may determine whether an interfering location point appears from the first point, the second point, and the third point based on the comparison. The one or more processors may remove the interfering location point when the interfering location point appears. The one or more processors may determine at least one effective location point from remainder of the first location point, the second location point, and the third location point.

In some embodiments, the reference velocity may be a maximum one of the at least one average velocity.

In some embodiments, the one or more processors may select a first effective location point, a second effective location point, and a third effective location point from the set of effective location points. The one or more processors may determine a first line based on the first effective location point, the second effective location point, and the third effective location point. The one or more processors may determine the path of the moving device based on the first line.

In some embodiments, the one or more processors may select a fourth effective location point from the set of effective location points. The one or more processors may determine a corresponding point to the fourth effective location point on the first line. The one or more processors may determine a distance between the fourth effective location point and the corresponding point. The one or more processors may determine that the distance may be less than a threshold. The one or more processors may update the first line based on the corresponding point. The one or more processors may determine the path of the moving device based on the updated first line.

In some embodiments, the one or more processors may determine that the distance may be larger than the threshold. The one or more processors may determine the fourth effective location point as a turning point of the path.

In some embodiments, the one or more processors may update the path of the moving device based on the first line and the turning point.

In some embodiments, the one or more processors may select a fifth effective location point and a sixth effective location point. The one or more processors may determine a second line based on the turning point, the fifth effective location point, and the sixth effective location point. The one or more processors may update the path of the moving device based on the first line and the second line.

According to another aspect of the present disclosure, a method may include one or more of the following operations. A computer server may obtain a plurality of location points relating to a moving device. The computer server may determine at least one average velocity of the moving device between two of the plurality of location points. The computer server may remove at least one interfering location point from the plurality of location points based on the at least one average velocity. The computer server may determine remainders of the plurality of location points as a set of effective location points based on the at least one average velocity. The computer server may determine a path of the moving device based on the set of effective location points. The computer server may store data for the path of the moving device in the one or more storage media.

In some embodiments, the computer server may identify a region where the plurality of location points located. The computer server may determine that map data may be unavailable to the region.

In some embodiments, the computer server may construct a map based on the determined paths corresponding to the plurality of moving devices.

In some embodiments, the computer server may select a first point, a second point, and a third point from the plurality of location points. The computer server may determine three average velocities of the moving device between any two of the first point, the second point, and the third point.

In some embodiments, the computer server may determine a reference velocity of the moving device. The computer server may perform a comparison between the three average velocities with the reference velocity. The computer server may determine whether an interfering location point appears from the first point, the second point, and the third point based on the comparison. The computer server may remove the interfering location point when the interfering location point appears. The computer server may determine at least one effective location point from remainder of the first location point, the second location point, and the third location point.

In some embodiments, the reference velocity may be a maximum one of the at least one average velocity.

In some embodiments, the computer server may select a first effective location point, a second effective location point, and a third effective location point from the set of effective location points. The computer server may determine a first line based on the first effective location point, the second effective location point, and the third effective location point. The computer server may determine the path of the moving device based on the first line.

In some embodiments, the computer server may select a fourth effective location point from the set of effective location points. The computer server may determine a corresponding point to the fourth effective location point on the first line. The computer server may determine a distance between the fourth effective location point and the corresponding point. The computer server may determine that the distance may be less than a threshold. The computer server may update the first line based on the corresponding point. The computer server may determine the path of the moving device based on the updated first line.

In some embodiments, the computer server may determine that the distance may be larger than the threshold. The computer server may determine the fourth effective location point as a turning point of the path.

In some embodiments, the computer server may update the path of the moving device based on the first line and the turning point.

In some embodiments, the computer server may select a fifth effective location point and a sixth effective location point. The computer server may determine a second line based on the turning point, the fifth effective location point, and the sixth effective location point. The computer server may update the path of the moving device based on the first line and the second line.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 3-A is a block diagram illustrating an exemplary processing engine according to some embodiments of the present disclosure;

FIG. 3-B is a flowchart illustrating an exemplary process/method 300 for determining a path of a moving device according to some embodiments of the present disclosure;

FIGS. 5-A and 5-B are flowcharts illustrating an exemplary process/method 500 for determining a path of a moving device according to some embodiments of the present disclosure;

FIG. 6-A is a schematic diagram illustrating an exemplary process/method for determining a turning point according to some embodiments of the present disclosure; and FIG. 6-B is a schematic diagram illustrating an exemplary distribution of a plurality of location points according to some embodiments of the present disclosure.

DETAILED DESCRIPTION

Figure 1:
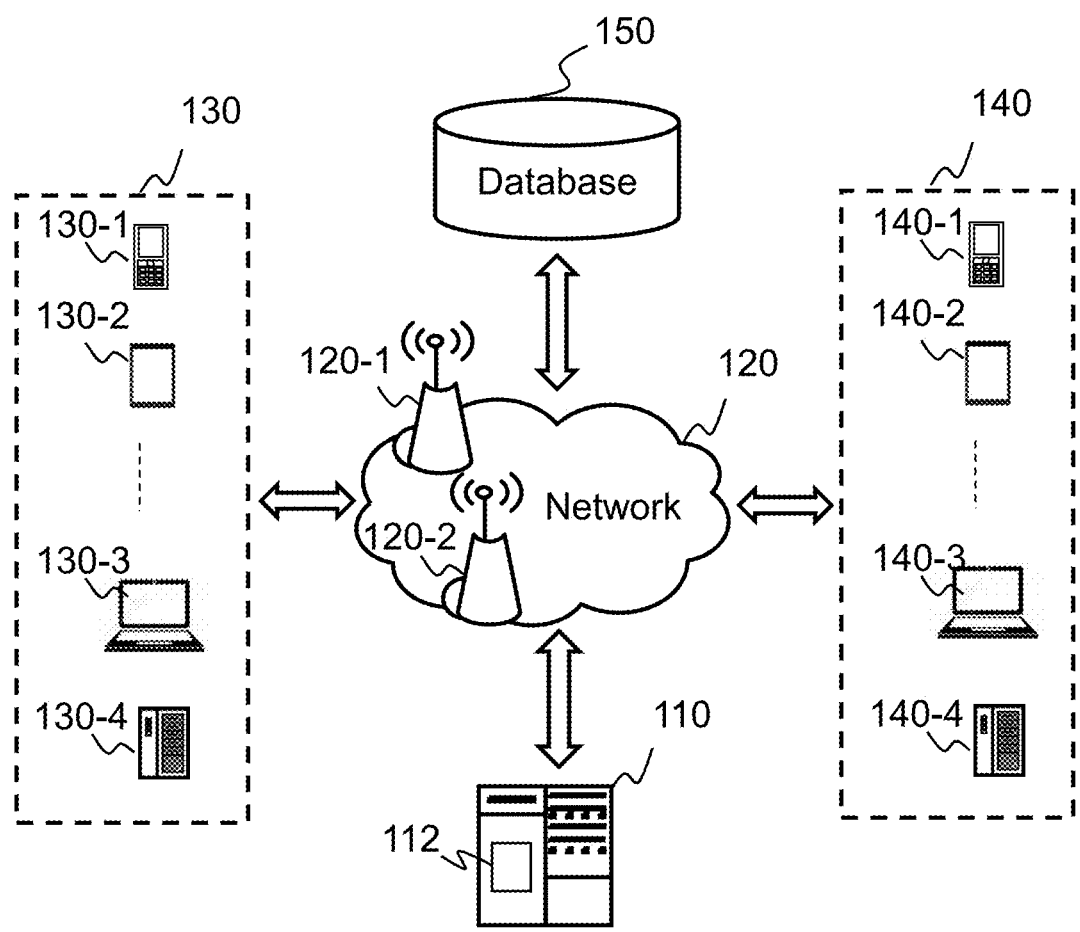
FIG. 1 is a block diagram of an exemplary on-demand service system 100 according to some embodiments.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the system and method in the present disclosure is described primarily in regard to allocate a set of sharable orders, it should also be understood that this is only one exemplary embodiment. The system or method of the present disclosure may be applied to any other kind of on demand service. For example, the system or method of the present disclosure may be applied to transportation systems of different environments including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, or the like, or any combination thereof. The transportation system may also include any transportation system for management and/or distribution, for example, a system for sending and/or receiving an express. The application of the system or method of the present disclosure may include a webpage, a plug-in of a browser, a client terminal, a custom system, an internal analysis system, an artificial intelligence robot, or the like, or any combination thereof.

The term "passenger," "requester," "service requester," and "customer" in the present disclosure are used interchangeably to refer to an individual, an entity or a tool that may request or order a service. Also, the term "driver," "provider," "service provider," and "supplier" in the present disclosure are used interchangeably to refer to an individual, an entity or a tool that may provide a service or facilitate the providing of the service. The term "user" in the present disclosure may refer to an individual, an entity or a tool that may request a service, order a service, provide a service, or facilitate the providing of the service. For example, the user may be a passenger, a driver, an operator, or the like, or any combination thereof. In the present disclosure, "passenger" and "passenger terminal" may be used interchangeably, and "driver" and "driver terminal" may be used interchangeably.

The term "service request" and "order" in the present disclosure are used interchangeably to refer to a request that may be initiated by a passenger, a requester, a service requester, a customer, a driver, a provider, a service provider, a supplier, or the like, or any combination thereof. The service request may be accepted by any one of a passenger, a requester, a service requester, a customer, a driver, a provider, a service provider, or a supplier. The service request may be chargeable or free.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

An aspect of the present disclosure relates to systems and methods for determining a path of a moving vehicle (e.g., a vehicle, a user terminal) based on location information (e.g., GPS points) of the moving device without map data and/or constructing a map based on a plurality of paths of a plurality of moving devices.

It should be noted that GPS positioning, overall, is a technology deeply rooted in Internet world. Determining a driving path of a vehicle without using a map is not possible without the possibility of real-time GPS positioning and real-time communication between a terminal device and a remote server. Therefore, the technical solution disclosed in the present disclosure is also a technology deeply rooted in Internet era.

For an application scenario of the platform or the processing engine, the application scenario may include user terminals (e.g., a requestor terminal or a provider terminal) and vehicles (e.g., a taxi). When the user terminals or the vehicles are moving along a road, the platform or the processing engine may obtain location information (e.g., GPS information) of the user terminals or the vehicles. For example, when a user hails a taxi, the platform or the processing engine may obtain location information of the user and provide it to the taxi driver. The platform or the processing engine may also obtain location information of the taxi driver (i.e., the provider terminal or the vehicle) and determine a moving path of the taxi driver.

FIG. 1 is a block diagram of an exemplary on-demand service system 100 according to some embodiments. For example, the on-demand service system 100 may be an online transportation service platform for transportation services such as taxi hailing, chauffeur service, express car, carpool, bus service, driver hire and shuttle service. The on-demand service system 100 may be an online platform including a server 110, a network 120, a requestor terminal 130, a provider terminal 140, and a database 150. The server 110 may include a processing engine 112.

In some embodiments, the server 110 may be a single server, or a server group. The server group may be centralized, or distributed (e.g., server 110 may be a distributed system). In some embodiments, the server 110 may be local or remote. For example, the server 110 may access information and/or data stored in the requestor terminal 130, the provider terminal 140, and/or the database 150 via the network 120. As another example, the server 110 may be directly connected to the requestor terminal 130, the provider terminal 140, and/or the database 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to the service request to perform one or more functions described in the present disclosure. For example, the processing engine 112 may determine a path of the requestor terminal 130, the provider terminal 104, or a vehicle relating to the on-demand service system 100. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof. In some embodiments, the processing engine 112 may be integrated in the requestor terminal 130 or the provider terminal 140.

The network 120 may facilitate exchange of information and/or data. In some embodiments, one or more components in the on-demand service system 100 (e.g., the server 110, the requestor terminal 130, the provider terminal 140, and the database 150) may send information and/or data to other component(s) in the on-demand service system 100 via the network 120. For example, the server 110 may obtain/acquire service request from the requestor terminal 130 via the network 120. In some embodiments, the network 120 may be any type of wired or wireless network, or combination thereof. Merely by way of example, the network 130 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the on-demand service system 100 may be connected to the network 120 to exchange data and/or information.

In some embodiments, a requestor may be a user of the requestor terminal 130. In some embodiments, the user of the requestor terminal 130 may be someone other than the requestor. For example, a user A of the requestor terminal 130 may use the requestor terminal 130 to send a service request for a user B, or receive service and/or information or instructions from the server 110. In some embodiments, a provider may be a user of the provider terminal 140. In some embodiments, the user of the provider terminal 140 may be someone other than the provider. For example, a user C of the provider terminal 140 may user the provider terminal 140 to receive a service request for a user D, and/or information or instructions from the server 110. In some embodiments, "requestor" and "requestor terminal" may be used interchangeably, and "provider" and "provider terminal" may be used interchangeably.

In some embodiments, the requestor terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a Hololens, a Gear VR, etc. In some embodiments, built-in device in the motor vehicle 130-4 may include an onboard computer, an onboard television, etc. In some embodiments, the requestor terminal 130 may be a device with positioning technology for locating the position of the requestor and/or the requestor terminal 130.

In some embodiments, the provider terminal 140 may be similar to, or the same device as the requestor terminal 130. In some embodiments, the provider terminal 140 may be a device with positioning technology for locating the position of the provider and/or the provider terminal 140. In some embodiments, the requestor terminal 130 and/or the provider terminal 140 may communicate with other positioning device to determine the position of the requestor, the requestor terminal 130, the provider, and/or the provider terminal 140. In some embodiments, the requestor terminal 130 and/or the provider terminal 140 may send positioning information to the server 110.

The database 150 may store data and/or instructions. In some embodiments, the database 150 may store data obtained from the requestor terminal 130 and/or the provider terminal 140. In some embodiments, the database 150 may store data and/or instructions that the server 110 may execute or use to perform exemplary methods described in the present disclosure. In some embodiments, database 150 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the database 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the database 150 may be connected to the network 120 to communicate with one or more components in the on-demand service system 100 (e.g., the server 110, the requestor terminal 130, the provider terminal 140, etc.). One or more components in the on-demand service system 100 may access the data or instructions stored in the database 150 via the network 120. In some embodiments, the database 150 may be directly connected to or communicate with one or more components in the on-demand service system 100 (e.g., the server 110, the requestor terminal 130, the provider terminal 140, etc.). In some embodiments, the database 150 may be part of the server 110.

In some embodiments, one or more components in the on-demand service system 100 (e.g., the server 110, the requestor terminal 130, the provider terminal 140, etc.) may have a permission to access the database 150. In some embodiments, one or more components in the on-demand service system 100 may read and/or modify information relating to the requestor, provider, and/or the public when one or more conditions are met. For example, the server 110 may read and/or modify one or more users' information after a service. As another example, the provider terminal 140 may access information relating to the requestor when receiving a service request from the requestor terminal 130, but the provider terminal 140 may not modify the relevant information of the requestor.

In some embodiments, information exchanging of one or more components in the on-demand service system 100 may be achieved by way of requesting a service. The object of the service request may be any product. In some embodiments, the product may be a tangible product, or an immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

Figure 2:
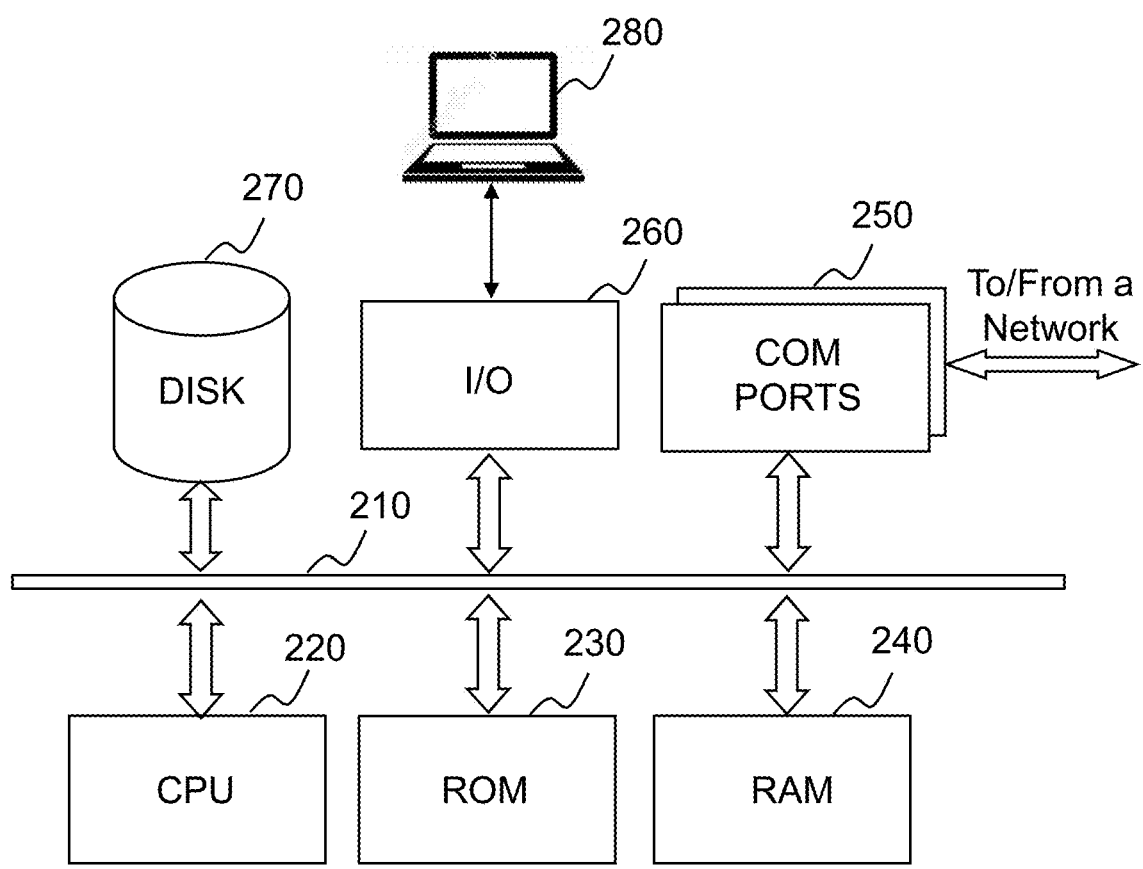
FIG. 2 is a block diagram illustrating an exemplary computing device in the on-demand service system according to some embodiments of the present disclosure.

FIG. 2 is a schematic diagram illustrating exemplary hardware and software components of a computing device 200 on which the server 110, the requestor terminal 130, and/or the provider terminal 140 may be implemented according to some embodiments of the present disclosure. For example, the processing engine 112 may be implemented on the computing device 200 and configured to perform functions of the processing engine 112 disclosed in this disclosure.

The computing device 200 may be a general purpose computer or a special purpose computer, both may be used to implement an on-demand system for the present disclosure. The computing device 200 may be used to implement any component of the on-demand service as described herein. For example, the processing engine 112 may be implemented on the computing device 200, via its hardware, software program, firmware, or a combination thereof. Although only one such computer is shown, for convenience, the computer functions relating to the on-demand service as described herein may be implemented in a distributed fashion on a number of similar platforms, to distribute the processing load.

The computing device 200, for example, may include COM ports 250 connected to and from a network connected thereto to facilitate data communications. The computing device 200 may also include a central processing unit (CPU) 220, in the form of one or more processors, for executing program instructions. The exemplary computer platform may include an internal communication bus 210, program storage and data storage of different forms, for example, a disk 270, and a read only memory (ROM) 230, or a random access memory (RAM) 240, for various data files to be processed and/or transmitted by the computer. The exemplary computer platform may also include program instructions stored in the ROM 230, RAM 240, and/or other type of non-transitory storage medium to be executed by the CPU 220. The methods and/or processes of the present disclosure may be implemented as the program instructions. The computing device 200 also includes an I/O component 260, supporting input/output between the computer and other components therein such as user interface elements 280. The computing device 200 may also receive programming and data via network communications.

Merely for illustration, only one CPU and/or processor is described in the computing device 200. However, it should be note that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

FIG. 3-A is a block diagram illustrating an exemplary processing engine 112 according to some embodiments of the present disclosure. The processing engine 112 may include an acquisition module 310, a velocity determination module 320, a pre-determination module 330, and a path determination module 340.

The acquisition module 310 may be configured to obtain a plurality of location points (e.g., GPS points) relating to a moving device. The moving device may include the requestor terminal 130, the provider terminal 140 or a vehicle of a provider. The acquisition module 310 may obtain the plurality of location points from a positioning system (e.g., a GPS, a driving recorder) in the requestor terminal 130, the provider terminal 140, or the vehicle.

The velocity determination module 320 may be configured to determine at least one average velocity of the moving device between two of the plurality of location points.

The pre-determination module 330 may be configured to determine a set of effective location points. For example, the pre-determination module 330 may determine whether interfering location point(s) appear and remove the interfering location point(s) from the plurality of location points.

The path determination module 340 may be configured to determine a path of the moving device based on the set of effective location points. The path of the moving device may be a straight line or a curve.

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the acquisition module 310 and the velocity determination module 320 may be integrated as a single module which may both obtain the plurality of location points and determine the at least one average velocity between any two of the plurality of location points.

FIG. 3-B is a flowchart illustrating an exemplary process/method 300 for determining a path of a moving device according to some embodiments of the present disclosure. The process and/or method 300 may be executed by the on-demand service system 100. For example, the process and/or method may be implemented as a set of instructions (e.g., an application) stored in the storage ROM 230 or RAM 240. The CPU 210 may execute the set of instructions and may accordingly be directed to perform the process and/or method 300.

In step 302, the processing engine 112 may obtain a plurality of location points (e.g., GPS points) relating to a moving device.

For example, the location points may be location points of the vehicle detected by a GPS device mounted on the vehicle. The location points may also be location points of a mobile terminal (e.g., the requestor terminal 130 or the provider terminal 140) in the vehicle. The number of the plurality of location points may be at least 3. When the processing engine 112 obtains the plurality of location points, the processing engine 112 may identify a region where the plurality of location points located and determine whether map data is available to the region. If the map data is available to the region, the processing engine 112 may analyze the plurality of location points based on the map data and determine a path (e.g., a portion of a road or a street) of the moving device on a map (e.g., a Tencent Map, a Google Map). If the map data is unavailable to the region, the processing engine 112 may further process the plurality of location points, for example, determine an average velocity between any two of the plurality of location points and determine whether an interfering location point appears. As used herein, the interfering location point may refer to an error point which may not reflect an actual position of the moving device. The error point may include a point which deviates from a normal track of the moving device or a point which is resulted from a system error. Since the interfering location point was incorrectly measured, it may result in an inaccurate estimated path of the moving device. The processing engine 112 may determine the interfering location point based on a plurality of average velocities between any two of the plurality of location points and eliminate the interfering location point from the plurality of location points.

In some embodiments, the processing engine 112 may obtain the plurality of location points from a positioning system integrated in the moving device. For example, the processing engine 112 may obtain the plurality of location points from a GPS in the requestor terminal 130, the provider terminal 140, or the vehicle. As another example, the processing engine 112 may obtain the plurality of location points from a driving recorder in the vehicle. The processing engine 112 may communicate with the GPS or the driving recorder via the network 120. As a further example, the provider terminal 140 may be connected or communicate with the vehicle, and the processing engine 112 may obtain the plurality of location points of the vehicle from the provider terminal 140. In some embodiments, the processing engine 112 may obtain the plurality of location points from the database 150. The database may store the plurality of location points of the moving device classified by time (e.g., an hour, a day, a week).

Any one of the plurality of location points may include position information and time information. The position information may refer to a geographical position (e.g., a latitude, a longitude, an altitude) of the moving device. The time information may indicate a time point when the moving device arrives at the geographical position. For example, the time information may be a time point when the positioning system sends the geographical information to the processing engine 112. As another example, the time information may be a time point when the processing engine 112 receives the graphical information from the positioning system. In this disclosure, the time information may be collectively referred to as "a time point of a location point".

In some embodiments, the processing engine 112 may obtain the plurality of location points periodically. For example, the processing engine 112 may obtain the plurality of location points according to a predetermined time interval (e.g., 5 s).

In step 304, the processing engine 112 may determine at least one average velocity of the moving device between two of the plurality of location points.

The processing engine 112 may determine the average velocity based on the position information and the time information corresponding to the two location points. For example, the processing engine 112 may determine a distance between two location points based on the position information and a time difference between the two location points based on the time information. The processing engine 112 may further determine an average velocity based on the distance and the time difference. It should be noted that "distance" used in this disclosure may refer to a spatial distance or a travel distance. As used herein, a spatial distance may refer to a distance of a path along which a vehicle can travel, such as a portion of road or a street.

In step 306, the processing engine 112 may determine a set of effective location points based on the at least one average velocity of the moving device. The processing engine 112 may determine one or more interfering location points and remove the interfering location points from the plurality of location points. The processing engine 112 may define a velocity threshold (also referred to as a "reference velocity") and compare the average velocity with the velocity threshold. For example, if the average velocity between the two location points is larger than or equal to the velocity threshold, meaning that either the vehicle experienced an abnormal speed change during navigation, which is assumed unlikely, or at least one of the two location points were not correctly measured. Accordingly, the processing engine 112 may determine that at least one of the two location points may be an interfering location point.

In step 308, the processing engine 112 may determine a path of the moving device based on the set of effective location points. The processing engine 112 may determine one or more lines based on the set of effective location points. The line may be a straight line or a curve. The processing engine 112 may determine the line(s) based on a fitting approach. The fitting approach may include a linear fitting approach, a polynomial fitting approach, or the like, or a combination thereof. The processing engine 112 may further determine the path of the moving device based on the one or more lines. For example, the processing engine 112 may determine two lines and connect the two lines as a path. In some embodiments, the processing engine 112 may divide the set of effective location points into a plurality of groups (e.g., a group including 3 effective location points) and process the plurality of groups simultaneously or successively. For example, for each of the plurality of groups, the processing engine 112 may determine a line based on a linear regression. The processing engine 112 may further determine the path of the moving device by connecting a plurality of lines.

In some embodiments, the processing engine 112 may further store data for the path of the moving device in the database 150 or any storage device disclosed elsewhere in the present disclosure.

In some embodiments, the processing engine 112 may further direct a display (e.g., a screen) associated with the moving device (e.g. the requestor terminal 130, the provider terminal 140, etc.) to display the path of the moving device.

In some embodiments, the processing engine 112 may determine a plurality of paths for a plurality of moving devices. For example, for a region where map data is unavailable, the processing engine 112 may collect location information (e.g., GPS points) of a plurality of vehicles travelling in the region, and determine a path for each of the plurality of vehicles. The determined paths of the plurality of vehicles may indicate a road network in the region. In some embodiments, the processing engine 112 may construct a map based on the determined paths corresponding to the plurality of vehicles. Furthermore, the processing engine 112 may update the map at a certain time interval (e.g., 10 minutes). In some embodiments, the processing engine 112 may store the map of the region in the database 150 or any storage device disclosed elsewhere in the present disclosure.

In some embodiments, the number of the plurality of location points or the number of the set of effective location points may be 2. In this situation, the processing engine 112 may directly connect the two location points and determine the path of the moving device. In some embodiments, the number of the plurality of location points or the set of effective location points may be only 1. this situation, the processing engine 112 may provide an alert or provide a notification to a user (e.g., a requestor or a provider) to notify an error.

In some embodiments, as described in connection with FIG. 1, the processing engine 112 may be integrated in the requestor terminal 130 or the provider terminal 140. The processing engine 112 may obtain location points of the requestor terminal 130 or the provider terminal 140 and determine a path of the requestor terminal 130 or the provider terminal 140 based on the location points. The processing engine 112 may further store the path of the requestor terminal 130 or the provider terminal 140 in the database 150 or a storage (e.g., the ROM 230 or the RAM 240) of the requestor terminal 130 or the provider terminal 140. It should be noted that other than the application scenario illustrated in FIG. 1, the processing engine 112 may be used in any system (e.g., an intelligent transportation system) and integrated in any moving device used to determine a path of the moving device.

Figure 4:
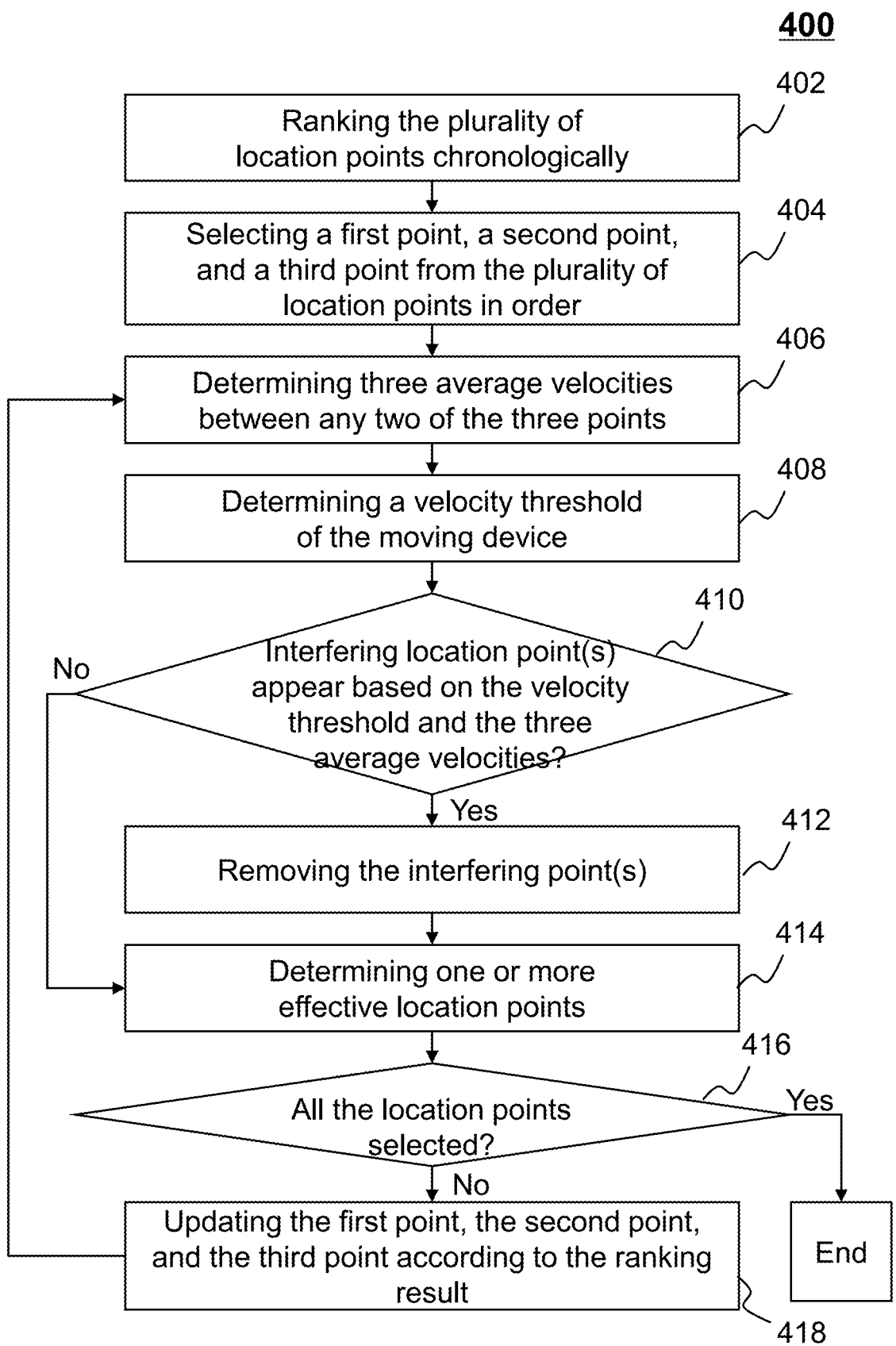
FIG. 4 is a flowchart illustrating an exemplary process/method 400 for determining a set of effective location points according to some embodiments of the present disclosure.

FIG. 4 is a flowchart illustrating an exemplary process/method 400 for determining a set of effective location points according to some embodiments of the present disclosure. The process and/or method 400 may be executed by the on-demand service system 100. For example, the process and/or method may be implemented as a set of instructions (e.g., an application) stored in the storage ROM 230 or RAM 240. The CPU 210 may execute the set of instructions and may accordingly be directed to perform the process and/or method 400.

In step 402, the processing engine 112 may rank the plurality of location points chronologically. The number of the plurality of location points may be at least 3. As used herein, "rank chronologically" may refer to that the processing engine 112 may rank the plurality of location points according to the time points of the plurality of location points, for example, from early to late. As illustrated in Table 1, the processing engine 112 may generate a first ranking result.

TABLE 1 a schematic table illustrating a ranking result of the plurality of location points

| Location point | Time point | First ranking result |
|---|---|---|
| 1 | 9:00 | 1 |
| 2 | 9:01 | 2 |
| 3 | 9:02 | 3 |
| ... | ... | ... |
| n | 10:00 | n |

In step 404, the processing engine 112 may select a first point, a second point, and a third point from the plurality of location points in order according to the first ranking result. For example, the processing engine 112 may select the first 3 location points as the first point, the second point, and the third point according to the first ranking result.

In step 406, the processing engine 112 may determine three average velocities between any two of the first point, the second point, and the third point. For example, the processing engine 112 may determine a first average velocity between the first point and the second point, a second average velocity between the second point and the third point, and a third average velocity between the first point and the third point. For convenience and illustration purposes, the first point is described as point a, the second point is described as point b, and the third point is described as point c. Therefore, the first average velocity is described as $v_{ab}$, the second average velocity is described as $v_{bc}$, and the third average velocity is described as $v_{ac}$.

In step 408, the processing engine 112 may determine a velocity threshold of the moving device. The velocity threshold may be default settings of the on-demand service system 100, or may be adjustable depending on different situations. For example, in traffic peak period, the velocity threshold may be relatively small (e.g., 50 km/h), whereas in idle period (e.g., 1:00-5:00 am), the velocity threshold may be relatively large (e.g., 80 km/h). As another example, the processing engine 112 may determine a global average velocity between the earliest location point (e.g., location point 1 illustrated in Table 1) and the latest location point (e.g., location point n illustrated in Table 1) as the velocity threshold.

In step 410, the processing engine 112 may determine whether any interfering location points appear based on the velocity threshold and the three average velocities. For example, the processing engine 112 may compare $v_{ab}$, $v_{bc}$, and $v_{ac}$ with the velocity threshold and generate a comparison result illustrated in Table 2 below. The processing engine 112 may determine whether any interfering location points may appear or which point may be an interfering location point according to the comparison result.

TABLE 2 a schematic table illustrating an exemplary determination result for interfering location points

| Comparison between $v_{ab}$ and $v_{limit}$ | Comparison between $v_{bc}$ and $v_{limit}$ | Comparison between $v_{ac}$ and $v_{limit}$ | Interfering location point |
|---|---|---|---|
| $v_{ab} < v_{limit}$ | $v_{bc} < v_{limit}$ | $v_{ac} < v_{limit}$ | / |
| | | $v_{ac} > v_{limit}$ | N/A |
| | $v_{bc} > v_{limit}$ | $v_{ac} < v_{limit}$ | b |
| | | $v_{ac} > v_{limit}$ | c |
| $v_{ab} > v_{limit}$ | $v_{bc} < v_{limit}$ | $v_{ac} < v_{limit}$ | b |
| | | $v_{ac} > v_{limit}$ | b, c |
| | $v_{bc} > v_{limit}$ | $v_{ac} < v_{limit}$ | b |
| | | $v_{ac} > v_{limit}$ | b, c | where $v_{limit}$ refers to the velocity threshold, and the slash in Table 2 indicates that no interfering location point appears.

If the processing engine 112 determines that one or more interfering location points appear among point a, point b, and point c, the processing engine 112 may execute the process/method 400 to step 412 to remove the interfering location point(s), and then to step 412 to determine one or more effective location points. If the processing engine 112 determines that no interfering location point appears among point a, point b, and point c, the processing engine 112 may execute the process/method 400 to step 414 to determine point a, point b, and point c as effective location points.

In step 416, the processing engine 112 may determine whether all the plurality of location points is selected. If so, the processing engine 112 may execute the process and/or method 400 to end. The processing engine 112 may then determine a path of the moving device based on the effective location points. If not, the processing engine 112 may execute the process and/or method 400 to step 418.

In step 418, the processing engine 112 may update the first point, the second point, and the third point according to the first ranking result.

The processing engine 112 may determine an updated first point, an updated second point, and an updated third point, and further repeat at least one of steps 406-414 until all the location points are selected.

In some embodiments, if the processing engine 112 determines more than one effective location points in step 414, the processing engine 112 may determine the latest one in the effective location points as the updated first point. As used herein, "latest one" may refer to a location point with a latest time point with other location point(s) according to the first ranking result. For example, if the processing engine 112 determines point a and point c as effective location points in step 414, the processing engine 112 may determine point c as the undated first point in step 418. In some embodiments, if the processing engine 112 determines only one effective location point (e.g., point a) in step 414, the processing engine 112 may directly determine the one effective location point as the undated first point in step 418. The processing engine 112 may then select following two location points (e.g., point d and point e) according to the first ranking result. The processing engine 112 may determine point d as the updated second point and determine point e as the undated third point.

FIGS. 5-A and 5-B are flowcharts illustrating an exemplary process/method 500 for determining a path of a moving according to some embodiments of the present disclosure. The process and/or method 500 may be executed by the on-demand service system 100. For example, the process and/or method may be implemented as a set of instructions (e.g., an application) stored in the storage ROM 230 or RAM 240. The CPU 210 may execute the set of instructions and may accordingly be directed to perform the process and/or method 500.

The process and/or method 500 may be a cyclic process until all the effective location points in the set of effective location points are processed. Through the cyclic process, the processing engine 112 may determine a plurality of lines (e.g., a first line, a second line, . . . , a nth line). In some intermediate steps, the processing engine 112 may update the plurality of lines and generate a plurality of updated lines (e.g., an updated first line, an updated second, . . . , an updated nth line). The processing engine 112 may determine the path of the moving device based on the plurality of lines and/or the plurality of updated lines.

In step 502, the processing engine 112 may rank the set of effective location points chronologically.

As described similarly with step 402, the processing engine 112 may rank the set of effective location points according to the time points of the effective location points and generate a second ranking result illustrated in Table 3 below.

TABLE 3 a schematic table illustrating a ranking result of the set of effective location points

| Effective location point | Time point | Second ranking result |
|---|---|---|
| 1' | 9:00 | 1 |
| 2' | 9:02 | 2 |
| 3' | 9:04 | 3 |
| . . . | . . . | . . . |
| m' | 10:00 | m |

In step 504, the processing engine 112 may select three effective location points from the set of effective location points in order according to the second ranking result.

For example, the processing engine 112 may select first three effective location points (e.g., effective location point 1', location point 2', and location point 3') according to the second ranking result.

In step 506, the processing engine 112 may determine a first line based on the three effective points.

The first line may be a straight line or a curve. The processing engine 112 may determine the first line according to a fitting approach. For example, the processing engine 112 may determine a straight line (e.g., a straight line A'C' illustrated in FIG. 6-A) according to a linear fitting approach. The first line may include a first starting point (e.g., point A' illustrated in FIG. 6-A) and a first ending point (e.g., point C' illustrated in FIG. 6-A).

In step 508, the processing engine 112 may determine whether all the effective location points are selected. If so, the processing engine 112 may execute the process and/or method 500 to step 510 to determine a path based on the first line. If not, the processing engine 112 may execute the process and/or method 500 to step 512.

In step 512, after the processing engine 112 determines the first line, the processing engine 112 may select a following effective location point with the three effective location points according to the second ranking result. For example, the processing engine 112 may select effective location point 4' from the set of effective location points.

In step 514, the processing engine 112 may determine a corresponding point of the selected following point on the first line. As used herein, the "corresponding point on the first line" may refer to a projective point of the selected following point on the first line or on an extending line of the first line. For example, the processing engine 112 may determine a reference line perpendicular to the first line from the selected following point and determine an intersection point of the reference line and the first line. The processing engine 112 may determine the intersection point (e.g., point $D_2'$ illustrated in FIG. 6-A) as the corresponding point of the selected following point. After the processing engine 112 determines the corresponding point, the processing engine 112 may execute the process and/or method 500 to node A 515 and perform at least some of steps starting from node A 515 illustrated in FIG. 5-B.

In step 516, the processing engine 112 may determine a distance between the selected following point and the corresponding point (e.g., a distance between point $D_2$ and point $D_2'$ illustrated in FIG. 6-A), and determine whether the distance is less than a distance threshold (e.g., 20 m). If so, the processing engine 112 may execute the process and/or method 500 to step 518 to update the first line based on the selected following point. If not, the processing engine 112 may execute the process and/or method 500 to step 520 to determine the following point as a turning point. As used herein, the turning point may indicate that the moving device is to be turning around from the first line.

In step 518, the processing engine 112 may update the first line based on the selected following point. In some embodiments, if the first line is a straight line, the processing engine 112 may update the first line by modifying the first start point or the first end point. For example, the processing engine 112 may modify the first end point as the intersection point of the reference line and the first line. As another example, the processing engine 112 may apply a linear fitting method on the three selected effective location points and the selected following point, and determine an updated first line. In some embodiments, if the first line is a curve, the processing engine 112 may update the first line by connecting the curve with the following point. After the processing engine 112 updates the first line, the processing engine 112 may execute the process and/or method 500 to node B 519 and repeat at least some of steps from step 508.

After the processing engine 112 determines the following point as a turning point in step 520, the processing engine 112 may determine whether all the effective location points are selected. If so, the processing engine 112 may execute the process and/or method 500 to step 524 to determine a path based on the first line and the turning point. For example, in step 524, the processing engine 112 may connect the end point of the first line with the turning point by a straight line or a curve. If not, the processing engine 112 may execute the process and/or method 500 to step 526 to select following two effective location points with the turning point according to the second ranking result.

In step 528, the processing engine 112 may determine a second line based on the turning point and the following two effective location points. Similar with the first line, the second line may be a straight line or a curve. If there is only one effective location point to be processed, the processing engine 112 may determine the second line by connecting the turning point and the last effective location point.

In step 530, the processing engine 112 may determine whether all the effective location points are selected. If so, the processing engine 112 may execute the process and/or method 500 to step 532 to determine a path based on the first line and the second line. If not, the processing engine 112 may execute the process and/or method 500 to node C 531 and repeat at least some of steps from step 512.

It should be noted that the above description is taking only one cyclic process as an example, in actual situations, there may be a plurality of cyclic processed. Further, the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, if the number of the set of effective location points is relatively large (e.g., 100), some of the steps in which the processing engine 112 determines whether all the effective location points are selected may be omitted.

FIG. 6-A is a schematic diagram illustrating an exemplary process/method for determining a turning point according to some embodiments of the present disclosure. As illustrated in FIG. 6-A, the processing engine 112 selects point A, point B, and point C from the set of effective location points. The processing engine 112 further determines a line A'C' based on point A, point B, and point C by a linear fitting approach. Line A'C' includes a starting point A' and an ending point C'.

After the processing engine 112 determines line A'C', the processing engine 112 may select a following point (e.g., point $D_1$ or point $D_2$) from the remainders of the set of effective location points. For point $D_1$, the processing engine 112 may determine a corresponding point $D_1''$ on line A'C' and determine a distance $D_1D_1''$ between point $D_1$ and point $D_1''$. The processing engine 112 may further compare the distance $D_1D_1''$ with a distance threshold. As illustrated, the distance $D_1D_1''$ is larger than the distance threshold, processing engine 112 may then determine point $D_1$ as a turning point. The processing engine 112 may further select following two effective location points (i.e., point E and point F) and determine a line $D_1'F'$.

For point $D_2$, the processing engine 112 may determine a corresponding point $D_2'$ on line A'C' and determine a distance $D_2D_2'$ between point $D_2$ and point $D_2'$. As illustrated, the distance $D_2D_2'$ is less than the distance threshold, the processing engine 112 may update line A'C' as line $A'D_2'$.

FIG. 6-B is a schematic diagram illustrating an exemplary distribution of the plurality of location points according to some embodiments of the present disclosure. As illustrated in FIG. 6-B, the dashed lines refer to a portion of a road or a street along which the moving device is moving. The map data is unavailable so that the road or the street may be invisible. The solid dots refer to the plurality of location points. The distribution of the plurality of location points may be a normal distribution along the road or the street, that is, the road or the street may be a regression line of the normal distribution. It may be supposed that the interfering location points have been removed, the processing engine 112 may apply a linear regression approach on the plurality of location points and determine a path of the moving device (i.e., the portion of the road or the street).

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A system comprising A system, comprising:
   a bus;
   one or more storage media electronically connected to the bus, including a set of instructions for determining a path of a moving device; and
   logic circuits electronically connected to the at least one storage medium via the bus, wherein during operation, the logic circuits load the set of instructions and for each moving device of a plurality of moving devices:
   obtain electronic signals associated with a plurality of location points relating to a moving device;
   determine a set of effective location points from the plurality of location points;
   determine a path of the moving device based on the set of effective location points; and
   send electronic signals to the bus to store data for the path of the moving device in the one or more storage media,
   wherein to determine the set of effective location points from the plurality of location points, the logic circuits further:
   rank the plurality of location points chronologically;
   during one or more iterations,
   select a first point, a second point, and a third point from the plurality of location points in order according to the ranking, the first point including an earliest location point of the plurality of location points or a latest effective location point from a previous iteration;

determine three average velocities of the moving device, the three average velocities of the moving device including a first average velocity between the first point and the second point, a second average velocity between the second point and the third point, and a third average velocity between the first point and the third point;

perform a comparison between the three average velocities with a reference velocity;

determine whether an interfering location point appears from the first point, the second point, and the third point based on the comparison;

remove the interfering location point when the interfering location point appears; and determine at least one effective location point from remainder of the first location point, the second location point, and the third location point; and determine remainders of the plurality of location points as the set of effective location points.

2. The system of claim 1, wherein the logic circuits further:
identify a region where the plurality of location points located; and
determine that map data is unavailable to the region.

3. The system of claim 1, wherein the logic circuits further:
construct a map based on paths corresponding to a plurality of moving devices.

4. The system of claim 1, wherein the reference velocity is a maximum one of the three average velocities.

5. The system of claim 1, wherein to determine the path of the moving device based on the set of effective location points, the logic circuits further:
select a first effective location point, a second effective location point, and a third effective location point from the set of effective location points;
determine a first line based on the first effective location point, the second effective location point, and the third effective location point; and
determine the path of the moving device based on the first line.

6. The system of claim 5, wherein to select the first effective location point, the second effective location point, and the third effective location point from the set of effective location points, the logic circuits further:
rank the set of effective location points chronologically; and
select three effective location points from the set of effective location points in order according to the ranking.

7. The system of claim 5, wherein the one or more processors are further directed to:
select a fourth effective location point from the set of effective location points;
determine a corresponding point to the fourth effective location point on the first line;
determine a distance between the fourth effective location point and the corresponding point;
determine the distance is less than a threshold;
update the first line based on the corresponding point; and
determine the path of the moving device based on the updated first line.

8. The system of claim 7, wherein the logic circuits further:
determine the distance is larger than the threshold; and
determine the fourth effective location point as a turning point of the path.

9. The system of claim 8, wherein the logic circuits further:
update the path of the moving device based on the first line and the turning point.

10. The system of claim 8, wherein the logic circuits further:
select a fifth effective location point and a sixth effective location point; determine a second line based on the turning point, the fifth effective
location point, and the sixth effective location point; and
update the path of the moving device based on the first line and the second line.

11. A method, comprising:
obtaining, by at least one electronic device, a plurality of location points relating to a moving device;
determine, by at least one electronic device, a set of effective location points from the plurality of location points;
determining, by the at least one electronic device, a path of the moving device based on the set of effective location points; and
storing, by the at least one electronic device, data for the path in the one or more storage media,
wherein the determining the set of effective location points from the plurality of location points further comprises:
ranking, by at least one electronic device, the plurality of location points chronologically;
during one or more iterations,
selecting, by at least one electronic device, a first point, a second point, and a third point from the plurality of location points in order according to the ranking, the first point including an earliest location point of the plurality of location points or a latest effective location point from a previous iteration;
determining, by at least one electronic device, three average velocities of the moving device, the three average velocities of the moving device including a first average velocity between the first point and the second point, a second average velocity between the second point and the third point, and a third average velocity between the first point and the third point;
performing, by at least one electronic device, a comparison between the three average velocities with a reference velocity;
determining, by at least one electronic device, whether an interfering location point appears from the first point, the second point, and the third point based on the comparison;
removing, by at least one electronic device, the interfering location point when the interfering location point appears; and
determining, by at least one electronic device, at least one effective location point from remainder of the first location point, the second location point, and the third location point; and
determining remainders of the plurality of location points as the set of effective location points.

12. The method of claim 11, further comprising:
identifying, by the at least one electronic device, a region where the plurality of location points located; and
determining, by the at least one electronic device, that map data is unavailable to the region.

13. The method of claim 11, further comprising:
constructing, by the at least one electronic device, a map based on paths corresponding to a plurality of moving devices.

14. The method of claim 11, wherein the reference velocity is a maximum one of the three average velocities.

15. The method of claim 11, wherein the determining of the path of the moving device based on the set of effective location points further comprises:
selecting, by the at least one electronic device, a first effective location point, a second effective location point, and a third effective location point from the set of effective location points;
determining, by the at least one electronic device, a first line based on the first effective location point, the second effective location point, and the third effective location point; and
determining, by the at least one electronic device, the path of the moving device based on the first line.

16. The method of claim 15, further comprising:
selecting, by the at least one electronic device, a fourth effective location point from the set of effective location points;
determining, by the at least one electronic device, a corresponding point to the fourth effective location point on the first line;
determining, by the at least one electronic device, a distance between the fourth effective location point and the corresponding point;
determining, by the at least one electronic device, the distance is less than a threshold;
updating, by the at least one electronic device, the first line based on the corresponding point; and
determining, by the at least one electronic device, the path of the moving device based on the updated first line.

17. The method of claim 16, further comprising:
determining, by the at least one electronic device, the distance is larger than the threshold; and
determining, by the at least one electronic device, the fourth effective location point as a turning point of the path.

18. The method of claim 17, further comprising:
updating, by the at least one electronic device, the path of the moving device based on the first line and the turning point.

19. The method of claim 17, further comprising:
selecting, by the at least one electronic device, a fifth effective location point and a sixth effective location point;
determining, by the at least one electronic device, a second line based on the turning point, the fifth effective location point, and the sixth effective location point; and
updating, by the at least one electronic device, the path of the moving device based on the first line and the second line.

20. A non-transitory computer readable medium including a set of instructions, the set of instructions, when executed by a computing device, causing the computing device to perform a method, the method comprising:
obtaining a plurality of location points relating to a moving device; determine a set of effective location points from the plurality of location points;
determining a path of the moving device based on the set of effective location points; and
storing data for the path in the one or more storage media,
wherein the determining the set of effective location points from the plurality of location points further comprises:
ranking the plurality of location points chronologically;
during one or more iterations,
selecting a first point, a second point, and a third point from the plurality of location points in order according to the ranking, the first point including an earliest location point of the plurality of location points or a latest effective location point from a previous iteration;
determining three average velocities of the moving device, the three average velocities of the moving device including a first average velocity between the first point and the second point, a second average velocity between the second point and the third point, and a third average velocity between the first point and the third point;
performing a comparison between the three average velocities with a reference velocity;
determining whether an interfering location point appears from the first point, the second point, and the third point based on the comparison;
removing the interfering location point when the interfering location point appears; and
determining at least one effective location point from remainder of the first location point, the second location point, and the third location point; and
determining remainders of the plurality of location points as the set of effective location points.

* * * * *